Nov. 2, 1937.   L. B. KIMBALL   2,097,925
MEANS FOR AUTOMATIC FUEL MIXTURE ADJUSTMENT ACCORDING TO TEMPERATURES
Filed Aug. 15, 1936   2 Sheets-Sheet 1
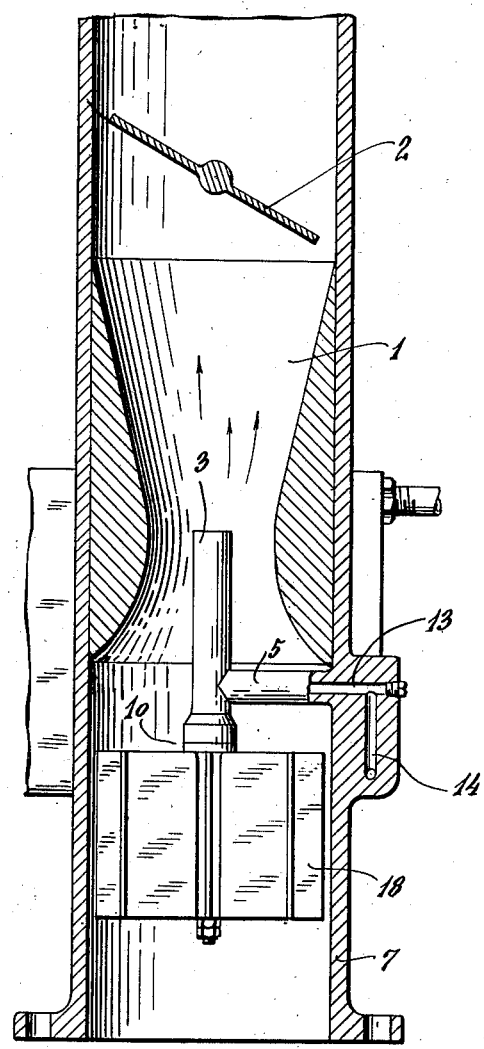
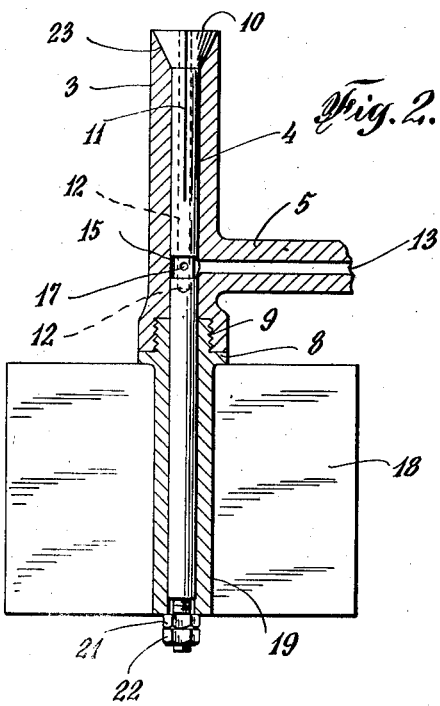
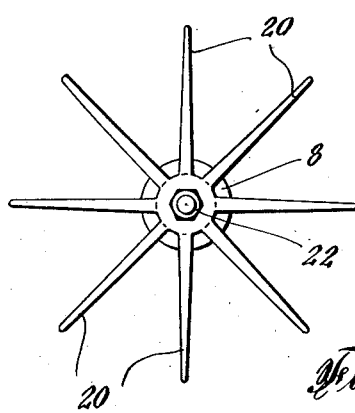
INVENTOR
LEO. B. KIMBALL
BY Sheffield & Betts
HIS ATTORNEYS Nov. 2, 1937.  L. B. KIMBALL  2,097,925
MEANS FOR AUTOMATIC FUEL MIXTURE ADJUSTMENT ACCORDING TO TEMPERATURES
Filed Aug. 15, 1936    2 Sheets-Sheet 2
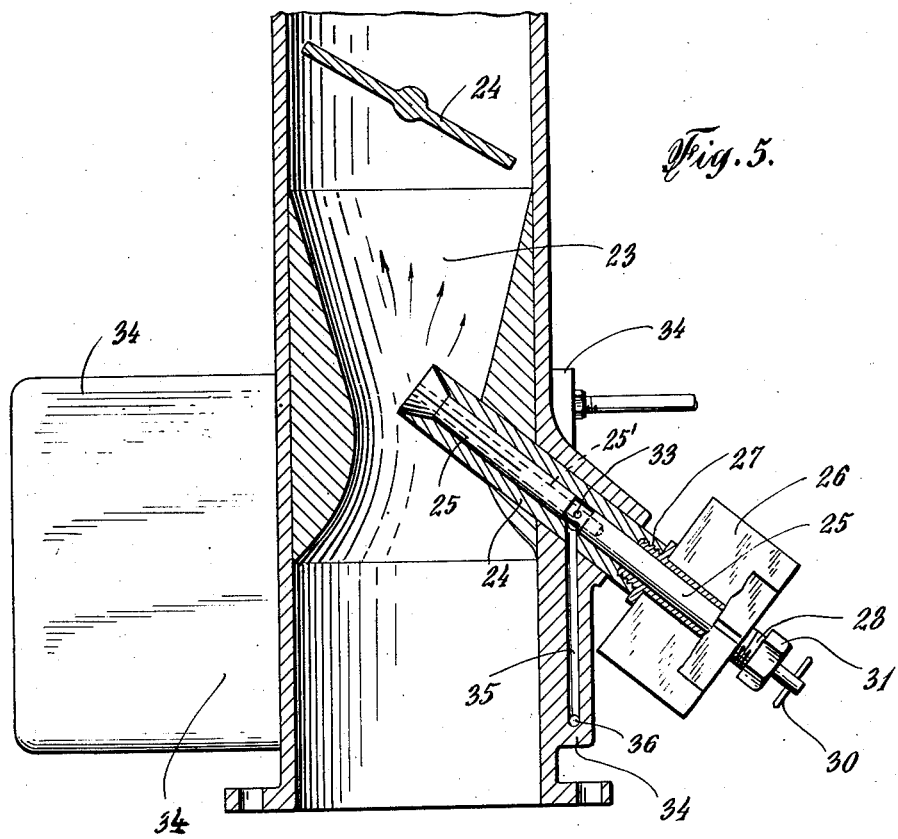
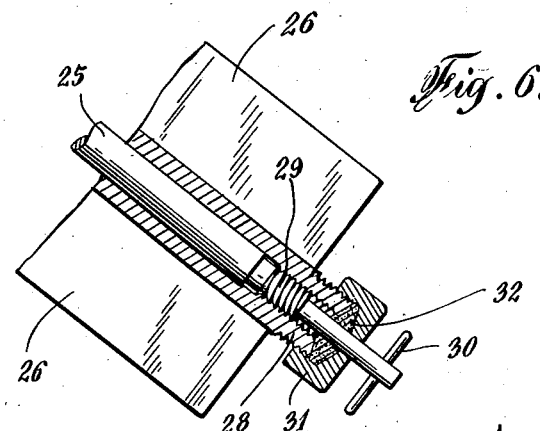
INVENTOR
LEO B. KIMBALL
BY Sheffield Betts
HIS ATTORNEYS Patented Nov. 2, 1937

2,097,925

UNITED STATES PATENT OFFICE 2,097,925

MEANS FOR AUTOMATIC FUEL MIXTURE ADJUSTMENT ACCORDING TO TEMPERATURES

Leo B. Kimball, New Haven, Conn., assignor to Fuel Development Corporation, a corporation of Delaware Application August 15, 1936, Serial No. 96,191

4 Claims. (Cl. 261—39)

The object of this invention is to proportion automatically the mixtures of fuel and air that are supplied to internal combustion power devices such as those used in automobiles and aircraft.

It will be appreciated that in the operation of an automobile or aircraft engine the parts and the surrounding atmosphere may be at low temperatures, particularly at high altitudes, in cold climates or during cold seasons of the year. It has been customary under such conditions to change the so-called choke or a mixture control in order that the mixture may be made somewhat richer in starting or until after the engine has been running for a short time to warm up the parts and also, in certain instances, to warm the inflowing air.

In warm weather and at low altitudes where heat prevails the opposite conditions may exist. One object, therefore, of this invention is to correct the effects on the fuel-air mixture resulting from changes in temperatures that may occur from time to time automatically, and without the attention of the driver or pilot.

Devices have heretofore been devised for regulating the air-fuel mixture depending upon the density of the atmosphere at various altitudes, but no device, so far as I am informed, has ever been produced for automatically changing the flow of fuel to accord with varying temperatures of the surrounding atmosphere.

The present invention is particularly useful in connection with supplying fuel-air mixtures to engines that are used to propel airplanes or other aircraft, but may also be used with automobile engines, as hereinafter described.

It will be appreciated that when an airplane or aircraft starts from the ground, even in the summer, all of the parts of the engine may be at the normal atmospheric temperature, but as the airplane rises in altitude the temperature of the atmosphere is considerably reduced until at high altitudes it may be reduced to points below freezing temperatures, or even in the vicinity of or below zero degrees F.

Heretofore it has been necessary for the operator or pilot of an airplane to vary the flow of fuel by operation of a mixture control device so that the correct air-fuel mixture is maintained when changes occur in the temperatures of the surrounding atmosphere. As is well known, the density of the atmosphere varies according to changes in temperature. The present invention, however, does away with manual adjustment of the fuel air mixtures for temperature changes and causes the adjustment to take place automatically according to variations in temperature of the atmosphere that enters the intake passages of an internal combustion engine.

As an example of two forms of my improved automatic control reference may be had to the following specification and to the accompanying drawings forming a part thereof, in which—

Fig. 1 is a longitudinal view, partly in section, showing the carburetor of an airplane and the relation of my improved device thereto;

Fig. 2 is a longitudinal view, partly in section showing said device detached from the carburetor;

Fig. 3 is a plan view of the upper end of the device as shown in Fig. 2;

Fig. 4 is a plan view of the heat controlling and regulating portion of the device as shown in the lower parts of Figs. 1 and 2;

Fig. 5 is a longitudinal sectional view of my improved device applied to a carburetor such as that for an automobile; and Fig. 6 is a detail of a portion thereof.

Referring to Fig. 1, the numeral 1 indicates a carburetor of the so-called "Venturi" type, and 2 the throttle valve therefor. The numeral 3 indicates a tubular or nozzle-like part shown more in detail in Fig. 2, that contains the slidable control member 4. Said tubular part 3 is supported in any suitable way, such as by a lateral stud or bracket 5 which is preferably cast integral with the lower part of the carburetor and which communicates with the extension 7. This portion 7 of the carburetor may be connected with any preferred form of intake device and in an airplane, a so-called "scoop" (not shown) may be used.

The tubular part 3 has attached to the lower end thereof a flanged member 8 which may be screw-threaded therein, as indicated at 9, or otherwise connected therewith. It forms a part of the thermostatic control hereinafter described. The central cylindrical member 4 is preferably made of a suitable steel or some other material having a low co-efficient of linear expansion. It is provided at its upper end with a conical or frustrum-shaped enlarged portion 10, and is slotted on several radii, as indicated at 11. It is also provided with a central hole or passage 12 that extends down through the cylindrical portion of the member 4 until it is below a point where the support 5 terminates. Said support is provided with a passage 13 that is connected with a suitable hole or conduit 14 to conduct the fuel or gasoline from the float-valve into the cylindrical member 4. Said fuel is allowed to enter said member through a shallow groove 15, which groove communicates with the central passage 12 in said cylindrical member 4 through a small hole or holes 17.

The lower end of the cylindrical member 4 carries a member 18 that expands and contracts with changes in temperature and consists of a central tube 19 and a plurality of radial fins or blades 20 attached thereto and to the flange 8. This is preferably made of some material having a high co-efficient of linear expansion, such as aluminum or copper, and is attached to the cylindrical rod or member 4 by means of a nut 21 and a set nut 22 to allow of adjustability.

The slots 11 above mentioned are carried sufficiently downward on the member 4 to give the three portions of the head or tapering part 10 sufficient resiliency to allow them to move toward and away from each other to a slight extent. This movement is produced by lowering or raising the cylindrical member 4 within the outer tubular member 3 because of the inclined surfaces indicated at 23.

Referring to the form of the device shown in Figs. 5 and 6, which illustrates one example of the use of my improved device with the carburetor for an automobile engine, it will be noted that the carburetor 23 is provided with a throttle valve 24 as is usual. The means for introducing the fuel into the carburetor is indicated by the inclined tubular part 24, which encloses the slidable member 25 made very similar to the member 4 shown in Fig. 2. At the lower end of said member 24 a thermostatic device 26, similar to the thermostatic devices 18 and 19 of Figs. 1 and 2, is attached to the part 24 by a screw-threaded connection 27 or in any other preferred way. The lower end of the cylindrical member or rod 25 is connected with the thermostatic member 26 by means of a screw-threaded projection 28 which is interiorly screw-threaded to correspond to screw-threads on the member 25 as indicated at 29. The end of the member 25 terminates in a cross-bar 30 or any other suitable device, such as a thumb nut, that is adapted to rotate said member 25. The outer end of the projection 28 is provided with screw-threads which engage an interiorly screw-threaded cap 31 that forms a packing gland as indicated at 32.

It will therefore be seen that by manually rotating the member 25 by turning the head or cross-bar 30, adjustment of the relation between the thermostatic member 26 and the upper end of the member 25 will be afforded so that the size of the opening therein can be set to produce the proper air-fuel mixtures. The member 25 is somewhat reduced in diameter, or grooved, as indicated at 33, and is provided with a small hole or holes entering the central passage 25' and through which the fuel may be supplied and flow through the passage 25' in the member 25 into the mixing chamber or carburetor 23.

The numeral 34 indicates a usual float chamber that is adapted to supply fuel to the carburetor. The chamber and float valve may take any preferred form, according to the particular type of automobile construction to which my improvement may be applied. The numeral 35 indicates a small passage that extends upwardly from a passage 36 connecting with the bottom of the float valve chamber 34, to a point adjacent the reduced portion of the member 25 as at 33. The passage 35 allows the fuel to enter the interior of the member 25 and thence to be injected into the carburetor 23.

It will be noted that the above device is similar in all substantial respects with that shown in Figs. 1-4 of the drawings except that the adjustment between the thermostatic member 26 and the central cylindrical member or rod 25 may be accomplished easily by simply rotating the bar or handle 30.

It will also be noted that this form of the device does away with the use of the necessity of inserting plugs having various sizes of orifices or adjustable needle valves for carburetors in automobiles, depending upon the season of the year in which the automobile is being driven, and in addition thereto it also supplies automatic adjustment of the flow of fuel according to variations in temperature that may occur at any time after the primary adjustment has been made, whereby the proportions of the air-fuel mixture are kept substantially constant.

The operation of the devices above described may be set forth as follows:

When the atmosphere is comparatively cool or cold, the aluminum member, comprising the blades 26, will be at the same temperature as the surrounding atmosphere in which it is placed or which passes through the carburetor to the engine. Therefore, the longitudinal dimension of the same will be a minimum and the cylindrical member 4 will be in a somewhat raised position, enabling the upper end thereof at 10 to expand laterally to its larger diameter. That will have the effect of causing the hole or passage 12 to be of large diameter as well as the openings represented by the slots 11. In view of that, the amount of fuel supplied to the carburetor will be greater and the mixture will continue to be of the correct proportions even when the temperature of the inflowing atmosphere is raised so that its density is reduced. In such an event the high temperature of the blades 20 and the tube 19 will cause the same to expand longitudinally and draw the cylindrical member 4 slightly downwards so that the size of the hole 16 and of the slots 11 is reduced to a corresponding extent.

That will reduce the metering and allow less fuel to enter the carburetor and therefore the fuel-air mixture will be kept at the right proportion.

This same action takes place upon various changes in temperature when an airplane is flying through the atmosphere when it varies somewhat in temperature between higher and lower degrees and such variations in temperature will immediately cause the device to maintain the correct mixture supplied to the engine so that it will operate at the desired efficiency.

Obviously, the same effect will take place when the device is applied to a carburetor for an automobile engine as above described, and, consequently, more fuel will be supplied to the engine when the temperature of the atmosphere is reduced. On the other hand, in summer weather, or when traveling over roads at low altitudes where the heat is intense, the fuel supplied to the engine will be less.

Having thus described this form of my invention, what I claim and desire to protect by Letters Patent is:

1. An automatic air-fuel mixture regulating device for internal combustion engines, comprising, a carburetor, a tube therein for introducing fuel, said tube containing a member having an outlet orifice that is capable of variable size, means for supplying fuel to said orifice, and a device operated by changes in the temperature of the surrounding atmosphere to vary the effective area of said orifice.

2. An automatic air-fuel mixture regulating device for internal combustion engines, comprising, a carburetor, means therein for introducing fuel, said means including a slidable member having a resilient outer end that is adapted to contract and expand diametrically and having a longitudinal passage therethrough, means for supplying fuel to said passage, and a device connected with said slidable member and operated by changes in the temperature of the surrounding atmosphere to contract and allow expansion of said resilient upper end to vary the cross-section of said passage.

3. An automatic air-fuel mixture regulating device for internal combustion engines, comprising, a carburetor, means therein for introducing fuel, said means including a tubular part having contacting and guiding surfaces at its upper end, a slidable member in said tubular part and having a resilient portion that is adapted to contract and expand diametrically, there being a longitudinal passage therethrough, means for supplying fuel to said passage, and a thermostatic device connected with the lower end of said slidable member to move the same longitudinally to contract and allow expansion of the resilient upper portion of said member and vary the cross-section of said passage.

4. An automatic air-fuel mixture regulating device for internal combustion engines, comprising, a carburetor, means therein for introducing fuel, said means including a tubular part having contracting and guiding surfaces at its upper end, a slidable member in said tubular part and having a resilient enlarged outer end that is provided with a plurality of radial slots to allow contraction and expansion thereof, there being a longitudinal passage therethrough, means for supplying fuel to said passage and a thermostatically expandible and contractable device having radial fins or wings attached to the lower end of said slidable member and having one end thereof fixed to the lower end of said tubular part, whereby said slidable member is moved longitudinally to contract and allow expansion of the slotted upper end thereof to vary the cross section of said passage.

LEO B. KIMBALL.